G. N. KINNELL.
OVERSHOE FOR HORSES.
APPLICATION FILED OCT. 30, 1908.
1,010,380.
Patented Nov. 28, 1911.
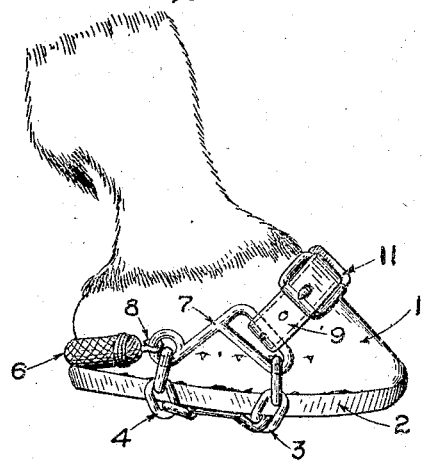
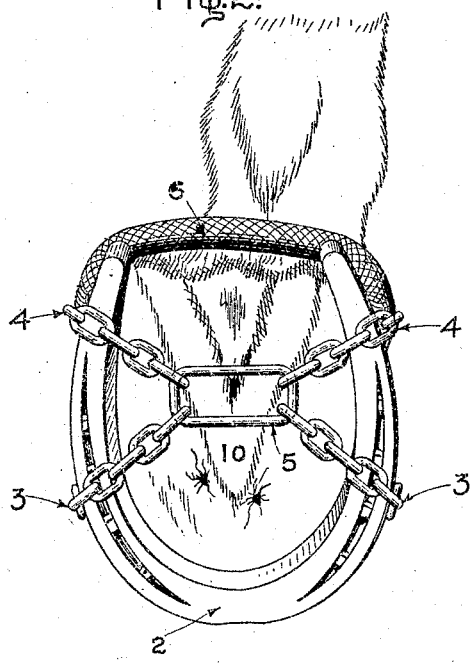
Witnesses:
M. G. Crozier
Maria F. Merich
Inventor,
George N. Kinnell,
by Jno. J. Chillbury,
Att'y.

UNITED STATES PATENT OFFICE.

GEORGE N. KINNELL, OF PITTSFIELD, MASSACHUSETTS, ASSIGNOR TO THE KINNELL MANUFACTURING COMPANY, OF PITTSFIELD, MASSACHUSETTS, A CORPORATION OF MASSACHUSETTS.

OVERSHOE FOR HORSES.

1,010,380.  Specification of Letters Patent.  Patented Nov. 28, 1911.

Application filed October 30, 1908. Serial No. 460,336.

*To all whom it may concern:*

Be it known that I, GEORGE N. KINNELL, a citizen of the United States, residing at Pittsfield, in the county of Berkshire and Commonwealth of Massachusetts, have invented new and useful Improvements in Overshoes for Horses and other Hoofed Animals, of which the following is a full and complete specification, such as will enable those skilled in the art to which it appertains to make and use the same.

My present invention concerns a detachable overshoe comprising a tread portion and means for securing the same to the foot. The tread portion is preferably flexible and formed or provided with means for preventing slipping of the foot on slippery surfaces. The securing means comprises flexibly connected members preferably engaging only the hoofed portion of the foot.

One part of my invention particularly concerns the flexible tread, which preferably comprises contact members or bodies jointed or flexibly connected and arranged as a plurality of articulated strands or catenations extending beneath the tread of the hoof of a horse or other animal, preferably as tension members connected with the securing means. The flexibility of the tread permits a slight relative movement or play of the parts, and this, in connection with the open construction of the tread, operates to break up snow balls which sometimes tend to pack in the concavity under the hoof. The rigid bodies operate like calks flexibly secured beneath the bearing surfaces of the hoof or horse shoe. Both these functions make the device useful either as a substitute for or as a supplement to the ordinary horse shoe calks. The tread members are arranged so as not to injure tender parts of the foot, the inner ends of the strands being preferably interconnected by a common member spanning the frog.

Another part of my invention concerns the securing means whereby the tread is flexibly attached to the foot by members which engage the hoof only and have no direct bearing upon the skin or sensitive tissue of the foot or ankle. Said securing means consists of a member extending rearwardly around the heel of the hoof and operating to limit forward displacement, in combination with a second member extending diagonally over the toe, and operating to limit downward and rearward displacement. The rearward, forward, and upward resistances to displacement afforded by said members are applied as a support for the tread, preferably through separate flexible or jointed connections, preferably distributed along the side of the hoof near the lower margin thereof. Between adjacent tread connections, I preferably arrange a spreader adapted to maintain proper spacing of the points of tread attachment, and means, such as a lever, for equalizing or distributing the various stresses among the several members. These features are especially desirable where the tread connections are flexible or where the tread consists of chains, or is otherwise deficient in stiffness.

Having thus described the character and purpose of my invention, I will proceed to describe a specific useful form of embodiment thereof in connection with the accompanying drawings, wherein—

Figure 1 is a side view showing a hoof provided with an ordinary horse shoe, and having my improved tread and securing means in place thereon; Fig. 2 is a perspective bottom view of the same.

The contact members jointed to form the flexible tread are shown as short chains 3, 4, extending inwardly under the hoof 1 with their inner ends spaced apart by and interconnected through a common link 5, which is relatively flat and otherwise proportioned and arranged to protect the frog 10 from injury. As shown, the chain sections diverge, two on each side, from the common link 5, but a greater or less number of chains may be used, and their divergence and manner of interconnection may be varied. The ends of chain sections 3, 4, form flexible connections between the tread and securing means, and the distance to which they extend up the outer walls of the hoof will be greater or less according as the hoof is narrower or wider. The spacing of the several points of connection of the tread is maintained peripherally of the hoof by a heel member 6 extending around the heel of the hoof and adapted to oppose forward displacement, in combination with a toe member 9 passing across the toe and adapted to oppose downward and rearward displacement, together with intervening members 7, 7, which act as tension members to limit the distance to which the outer ends of chains 3, 4, can be separated by the opposing stresses of heel member 6 and toe member 9. Moreover, when said members 7 are made rigid, as I prefer to make them, they act as spreaders to maintain the angles of the tension members as well as limit said distance.

There are various arrangements of tackle and leverage which may be used to coördinate and distribute the stresses of the several members so as to maintain the position and spacing of chains 3, 3, and 4, 4, and of heel member 6, but most of them will be found to involve the use of a stiffening member for spreading the flexible tread and thus spacing the outer portion of the chains 3, 4. In the particular form shown in the drawings, the rigid members 7, 7, may be considered equalizers as well as spreaders. Insomuch as they are levers subject to rearward stress at the rear end, downward stress at both ends and upward and forward stress at a point above and between the ends, they tend to divide and to equalize the upward components of the diagonal stress of the toe member, between the rear members 4, 4, and the forward members 3, 3. Pull on any one member causes the leverage to tighten other members, thereby counterbalancing any excessive strain which may be localized on one of the members. Each member 7 comprises an elongated loop for the toe strap and an extension at approximately right angles thereto, provided with an eye for the rear tread connection and for the heel member 6. The strap loop, being approximately parallel with the front of the toe permits the strap to automatically position itself higher up for a large hoof or lower down for a small hoof.

Each member 7 determines and rigidly spaces apart three separate centers or axes of flexible attachment of the several tension members, thereby shortening the peripheral length and the radius of swing of each member. A large rigid link at 5 has a similar advantage with respect to the flexible tread.

While the above described arrangement for securing and spacing the tread connections independently of the presence or absence of stiffness of the tread is useful where either tread connections or tread are flexible, it is particularly adapted for use in combination with a flexible tread adapted to afford connection between diagonally opposite points in the base of the hoof. In case of the diverging, transverse chains shown herein, the lines of transmission of stress are through strap 9 and the two equalizers 7, 7, thence, from the forward end of each equalizer, downwardly and diagonally rearward across the tread through chain 3, central link 5, and chain 4 to the rear end of the corresponding equalizer on the other side of the hoof, the rear ends of the equalizers being also connected through the heel strap 6.

Thus, the forward chains 3, 3, with the toe strap 9, form a toe loop, while the rear chains 4, 4 with the heel member 6, form a heel loop, the two loops being tied together in the tread by link 5, so that the toe loop prevents rearward displacement of the heel loop and the heel loop prevents forward displacement of the toe loop. Portions of the heel loop and toe loop horizontally adjacent to each other on each side of the hoof, are lifted and drawn toward each other by a suitable take up. This changes the direction of pull of heel member 6, so as to apply the strain partly against the hoof and thus to decrease the downward strain on the projecting ends of the horse shoe. The take up is preferably the combined spreader and equalizing lever 7, described above.

The toe member 9, which may be of metal, fabric or other material, is shown as a leather strap extending diagonally across the toe of the hoof and lying flat upon the curved surface of the hoof along the line of shortest distance between its points of attachment. The strap is preferably doubled through the attaching loops and the buckle 11, thereby multiplying the tightening effect of a pull on the end of the strap.

The heel member 6 extends from the point 8 rearwardly about the heel of the hoof and engages both walls of the notches between the hoof and the projecting ends of horse shoe 2, so that the pull is exerted partly on the hoof and partly on the horse shoe. It should stand rough usage without stretching, and should be adapted to fit itself well down into said notches, without danger of working in far enough to wedge the shoe from the hoof. Hence, I prefer to make it of fine quality steel chain or of flexible, non-resilient wire, masked or cushioned with a covering of fabric, as, for instance, heavy baling wire used as a metallic core in a heavy sheath of stiff, closely woven cord. Such wire and fabric covering are sufficiently stiff and inextensible to stand the strain of practical use, at the same time the material of the wire and the material of the fabric covering are sufficiently non-resilient and flexible so that in use the wire bends and the covering becomes somewhat flattened, so that the heel member becomes molded to the configuration of the surface upon which it bears.

In applying my overshoe to the hoof, the toe strap 9 is loosened, the tread is arranged centrally over the base of the hoof, and the member 6 is seated in the notches between the hoof and the rear ends of the horse shoe. The parts are then fitted snugly to the hoof by tightening and buckling toe strap 9, care being taken not to displace the heel member 6. The connections of the several members are such that displacing stress or movement applied to one member operates to tighten up other members, and thus to prevent further displacement. Shifting of the device as a whole around the periphery of the hoof is limited by the resulting increase of stress diagonally across the tread. Hence, though every part of the device may be permitted a certain amount of play, and though the device as a whole is not positively anchored at any point, either to the hoof or to the horse shoe, the device is securely, yet yieldingly held with all its parts in proper position with respect to each other and to the hoof.

The tightening of strap 9 is primarily for the purpose of taking up slack sufficiently to fit the various members to the hoof, and though the tightening may be sufficient to establish considerable initial tension among the members, it is practically unnecessary to continuously maintain a condition of mutual internal stress between all parts of the device. Hence, it will be understood when I refer to various parts of the device as "tension" members, I do not mean to imply that it is desirable to maintain all members under mutual tension, or even that it is always necessary to take up all slack in every member, the word "tension" being used mainly with reference to the stresses set up among the members by the violent blows and displacing efforts to which the several parts are subject when the device is in practical use.

It will be understood by those skilled in the art that various additions, omissions, substitutions, and changes in the materials, forms, proportions and sizes of the parts and in various details of the device and of its operation, may be made without departing from the spirit of my invention.

I claim:

1. An overshoe of the class described, comprising a tread, and a plurality of spaced flexible connections for the tread, in combination with means independent of the tread for securing and spacing said tread connections, said means consisting of members passing around the toe and the heel of the hoof, together with intermediate tension members applied on each side of the hoof between said flexible connections near the lower margin of the hoof.

2. An overshoe comprising a flexible metallic tread spanning the region of maximum width on the bottom of the hoof and adapted to afford lines of tension diagonally across said region, tread connections extending along such lines of tension and spaced along the outer wall of the hoof, spreaders for spacing the tread connections at points near the lower margin of the hoof, and means for securing said parts to the hoof.

3. In an overshoe of the class described, securing means and a tension tread portion comprising oppositely arranged tension members converging forwardly from points at the sides of the tread in the rear of the region of maximum width, in combination with means for applying forward tension to said tension members.

4. In an overshoe of the class described, an open tread portion comprising diagonally arranged interconnected articulated members and tread securing means encircling the hoof around the toe and under the heel and adapted to be secured against downward displacement at the heel of the hoof solely by engagement with the rear of hoof protecting means held in fixed relation to the hoof by nails passing through the latter.

5. In an overshoe of the class described, a tread portion comprising diagonally arranged flexible tension members extending from side to side across the hoof cavity, in combination with spreaders therefor located on the outer walls of the hoof and means for securing said parts to the hoof, said securing means encircling the hoof around the toe and under the heel and adapted to be held against downward displacement at the heel of the hoof solely by engagement with the rear of hoof protecting means held in fixed relation to the hoof by nails passing through the latter.

6. In an overshoe for horses, etc., a flexible metallic tread and securing means therefor, including a toe member, and a heel member extending across under the heels of the hoof, in combination with tread connections extending upwardly at the side edges of the hoof and arranged to cause forward stresses applied to the tread, to take effect upon the heel member only in lines passing over the outer sides of the hoof.

7. An overshoe comprising a flexible toe, and a flexible heel loop, in combination with tension equalizers between said loops, on each side of the heel above the lower margin thereof, said loops having a connection across the frog of the hoof comprising a flat tension member connected to both loops and in tension relation therewith.

8. An overshoe comprising a toe loop with a flexibly connected tread portion, and a heel loop with a flexibly connected tread portion, said loop being adapted to be held against downward displacement by the rear end of the horseshoe, in combination with a tension take up connecting said loops along each side wall of the hoof.

9. An overshoe comprising a flexible toe loop, a flexible heel loop adapted to engage the notches between the ends of the horse shoe and the heels of the hoof, and a tension connection between said loops in the plane of the tread and adapted in use to exert a forward pull on the heel loop and a rearward tension on the toe loop.

10. A flexible overshoe comprising a toe loop including a flexibly connected tread portion, a heel loop including a flexibly connected tread portion, and a plurality of tension connections flexibly jointed to both loops, and arranged in the plane of the tread, and on each side of the hoof above the lower margin thereof.

11. In an overshoe for hoofed animals, a flexible metallic tread comprising movable links intervening between the hoof and the ground, in combination with means for spreading said flexible tread and for securing it to the foot by distributed downward tension upon the hoof and upon the projecting rear ends of the horseshoe.

12. In an overshoe for horses, a tread portion and securing means extending over the toe, in combination with rearwardly extending yielding surfaced tension connections arranged to be pulled forward and wedged into the notches between the heels of the hoof and of the horse shoe and to bear upon the heel portions of the horse shoe and to be held thereby against downward displacement.

13. In an overshoe for horses, a tread and a toe member, in combination with a yielding surfaced heel member adapted to be pulled forward and wedged into the notches between the heels of the hoof and the projecting rear ends of the horse shoe, and connections whereby forward stress on said tread or toe member is applied to said heel member in a direction approximately parallel with the plane of the horse shoe.

14. In an overshoe for horses, a tread portion and a toe member, in combination with a heel member fitting itself into the notches between the heels of the hoof and the projecting rear ends of the horse shoe, said heel member consisting of a substantially inextensible flexible non-resilient metallic core masked or cushioned at points of engagement with said notches and adapted in use to become shaped to the configuration of the surface upon which it bears.

15. In an overshoe for horses, a tread portion and a toe member, in combination with a heel member fitting itself into the notches between the heels of the hoof and the projecting rear ends of the horse shoe, said heel member comprising a flexible non-resilient metallic core of high tensile strength provided between the free ends thereof with a heavy casing of woven cord fabric and adapted in use to become shaped to the configuration of the surface upon which it bears.

16. In an overshoe of the class described, a flexible tread portion and securing means comprising a tension member extending diagonally over the toe and rigid bent levers flexibly connected to the tread at their ends and connected to the toe member at points intermediate their ends.

17. An overshoe comprising a flexible tread, flexible tread connections at a plurality of points along the outer wall of the hoof, a rigid spreader independent of the tread for spacing adjacent tread connections, and means for applying upward and forward tension to the spreader.

18. In an overshoe of the class described, securing means in combination with a flexible tread portion, provided with relatively movable members adapted to serve as calks and stiffening members adapted to spread said tread and maintain proper spacing of the relatively movable members and to distribute tension therefrom about the hoof.

19. In an overshoe of the class described, securing means in combination with a flexible tread portion, provided with relatively movable members adapted to serve as calks and stiffening members arranged to spread said tread longitudinally of the hoof, and thereby maintain proper longitudinal spacing of the relatively movable members.

20. In an overshoe of the class described, securing means in combination with a tread portion formed of loosely linked members and provided with stiffening members for spreading the tread longitudinally of the hoof and means for distributing tension therefrom about the hoof.

21. In an overshoe of the class described, securing means in combination with a flexible tread adapted to be applied from side to side across the base of the hoof, and stiffening members adapted to spread the tread longitudinally of the hoof at points on either side of and freely out of contact with the frog.

22. In treads for overshoes, a tension member spanning and extending beyond the frog of the foot, in combination with a plurality of strands or catenations composed of movably connected links connected to said tension member at points beyond the frog and extending across the edges of the hoof.

23. In treads for overshoes, a plurality of strands or catenations of movably connected links intervening the hoof and the ground and extending over the edges of the hoof, and a single link connecting said strands or catenations, and extending wholly across the frog of the foot.

24. In treads for overshoes, a plurality of spaced chains diverging from a common locus located centrally of the underside of the hoof, and extending over the edges thereof, and means connecting the converging ends of the chains and holding them in relatively spaced positions freely away from the frog of the foot.

25. In overshoes, a tread comprising a plurality of strands or catenations of movably connected links diverging from a common link having its edges disposed in a substantially horizontal plane and extending wholly across the frog of the foot and freely under the same, and means provided about the wall of the hoof supporting the tread.

26. In overshoes, a tread comprising a plurality of movably connected links intervening the hoof and the ground and having their edges disposed in substantially vertical planes, and means preventing the links so disposed from bearing upon the frog of the foot.

27. In overshoes, a flexible tread and a band provided about the wall of the hoof supporting the tread and comprising a heel portion, a separate toe portion, and a tension member on either side of the hoof connecting said heel and toe portions and having a longitudinally extended body-portion provided at either end with loops or eyes.

28. In overshoes, the combination with a flexible sole member, of a band provided about the wall of the hoof supporting the sole member and having a heel element disposed about the rearward portion of the hoof and provided with a pliable casing of relatively large diameter adapted to prevent the heel element from working forward between the hoof and the shoe.

29. In overshoes, the combination with a tread comprising a plurality of catenations of movably connected links extending over the edges of the hoof and upon either side of the wall thereof, of a band provided about the wall of the hoof comprising a heel portion, a separate adjustable toe portion, and a link on either side of the hoof connecting said heel and toe portions and engaging the terminal links provided by the tread on the corresponding side of the hoof.

30. In overshoes, a band provided about the wall of the hoof supporting the tread and comprising a member disposed about the forward portion of the hoof and a separate member disposed about the rearward portion of the hoof and connected to the forward member, said rearwardly disposed member having a wire element and a casing element of relatively soft yielding substance enveloping the body-portion of the wire element.

31. In overshoes, the combination with a tread having a spaced chain structure extending over the edges of the hoof and on either side thereof, of a band provided about the wall of the hoof supporting the tread and comprising a heel portion, a separate adjustable toe portion, and a link on either side of the hoof connecting said heel and toe portions and attached to the tread, said link being provided with means for holding the several chains of the tread in spaced positions relatively to each other.

32. In overshoes, a flexible tread comprising a peripheral portion of jointed members adapted, formed, and arranged to serve as calks beneath the edges of the hoof, and a central interconnecting portion spanning the frog of the foot, constructed and arranged to avoid injury to the frog and to prevent said peripheral portion from coming in contact with the frog.

33. In overshoes, a tread comprising a plurality of articulated strands in combination with a securing band extending from the toe about the side walls and heel of the hoof, said tread being flexibly connected to said band at a plurality of points along the sides of the hoof and at substantially fixed distances along the length of the band, and means for adjustably tightening the ends of said band at the toe only.

34. In an overshoe for horses, a tread and a toe member, in combination with a heel member adapted to be seated in the notches between the heels of the hoof and the projecting rear ends of the horse shoe, and connections whereby forward stress on said tread takes effect on said heel member only.

35. In overshoes, a plurality of articulated strands extending from side to side across the tread of the hoof, in combination with a band extending about the walls and heel of the hoof and supporting the said strands at a plurality of points along the sides of the hoof, and adjustable tightening means for said band passing over the toe forward of the foremost connection of said band to the articulated strands.

36. In treads for overshoes, a plurality of strands or catenations composed of movably connected links extending from points freely beyond the frog of the foot over the edges of the hoof, and a common link connecting said strands or catenations.

37. In securing means for overshoes, a tension member of relatively heavy non-resilient, flexible wire with a heavy, fibrous covering, said wire and covering being adapted in use to become shaped to the configuration of the surface upon which it bears.

38. In an overshoe for horses, the combination with the tread, horizontally disposed double looped side members on each side having both loops connected to the tread, means connecting the rear portions of the side pieces, and means connecting the front loops thereof.

In testimony that I claim the foregoing as my invention I have hereunto signed my name in the presence of two subscribing witnesses.

GEORGE N. KINNELL.

Witnesses:
ALEXANDER G. UPTEGRAFF,
WILLIAM E. BAGG.